United States Patent Office 3,843,483
Patented Oct. 22, 1974

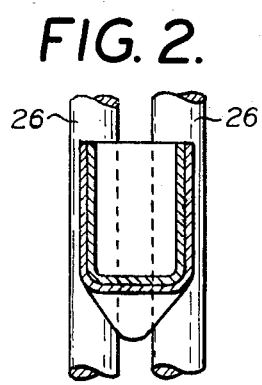
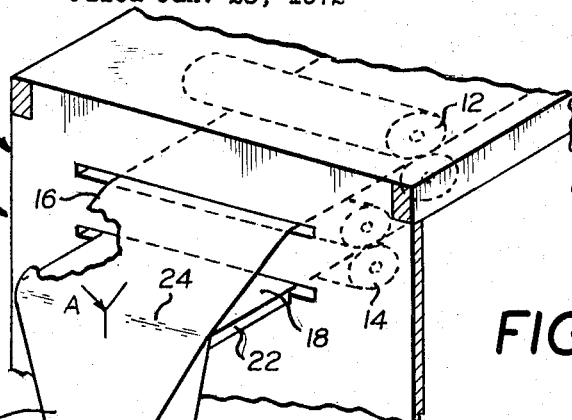
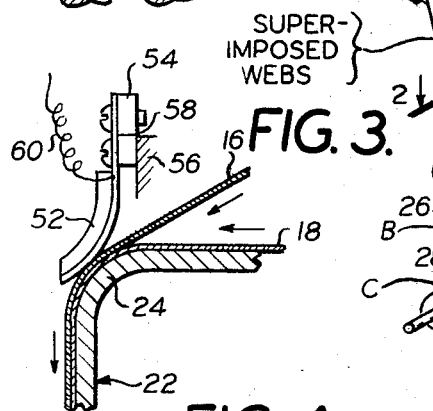
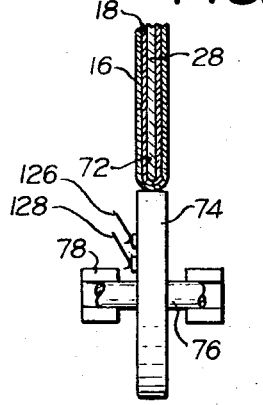
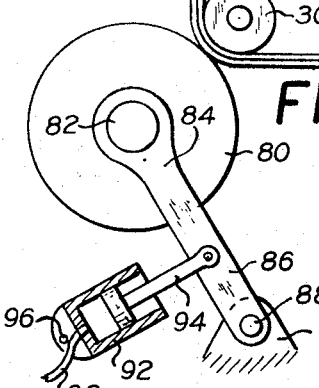
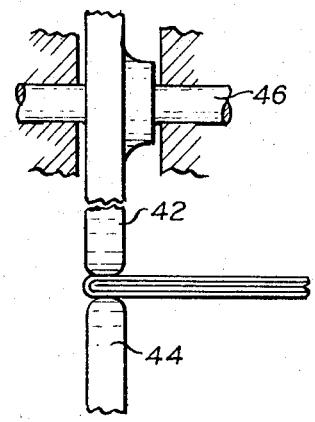
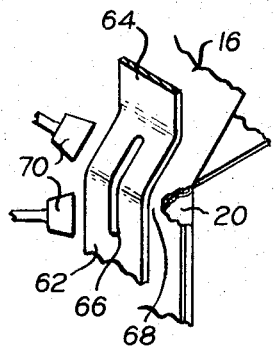
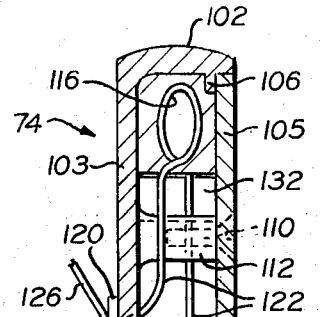

3,843,483
APPARATUS FOR WELDING PAPER ON
WEB PRESS
Bernard T. Sendor, 608 Blair Drive, Westbury, N.Y.
11590, and Mortimer S. Sendor, 80—30 221st St.,
Queens Village, N.Y. 11427
Filed Jan. 28, 1972, Ser. No. 221,564
Int. Cl. B41j 13/58
U.S. Cl. 156—380           9 Claims

ABSTRACT OF THE DISCLOSURE

This apparatus welds paper sheets together to connect them without requiring staples, paste or other adhesives, or other conventional paper fastening means. The energy for welding can be applied at any one of a number of locations with respect to the printing press. It can be applied at any location after the webs, which are to be bonded together, have been brought into superimposed relation and are held in contact with sufficient pressure to insure that they contact substantially over the entire areas that are to be bonded. Hot rollers, concentrated radiant heat, radio frequency electric power, or laser beams, can be used to supply the energy for welding.

BACKGROUND AND SUMMARY OF THE INVENTION

The welding together of paper is disclosed in Pat. No. 3,560,290, issued Feb. 2, 1971. The paper used is a special grade of paper that is of uniform composition throughout its area and that includes a resin system that will weld the contacting sheets at any location over the area. It can be used for binding books without adhesive or mechanical binding methods, such as staples or sewing.

Outstanding advantages of this invention are that it is clean, it involves no paste or glue that requires accurate application to secure sufficient adhesive without spilling over other adjacent areas, and that it involves no clean-up of application apparatus or use of "hot melt" that gives off toxic fumes.

In applying paper welding means to a web press, this invention locates the welding station along the existing course of the paper at a location beyond the region where the superimposed webs, that are to be bonded, have already been brought together, and applies the energy for welding to the paper at a rate which is coordinated with the speed of travel of the web through the press so that the welding can be done with the paper travelling at the full press speed.

The energy for making the weld can be applied in different ways. Where the thickness of the paper to be penetrated by heat is small, a hot roll provides the most economical means for putting welding energy into the paper. In order to maintain the temperature of the roll it is preferably made of large circumference so as to obtain lower surface speed of the roll circumferentially and more time for each portion of the circumference to be reheated to compensate for the heat transferred to the paper during contact with the paper. High intensity radiant heat, especially infra red heat can be used without touching the paper, and therefore with minimum friction. If the number of layers of paper to be welded makes conduction of heat to the inner sheets impractical, radio frequency electric energy is used. A laser beam is also suitable, though of unnecessarily high cost at the present time. Any other energy source is suitable which will supply the necessary heat through the full thickness of the group of paper sheets or webs to be welded without raising the temperature of the outer sheets so high as to deteriorate the paper.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view showing a plurality of webs passing through the apparatus of a web printing press and showing means for welding superimposed sheets beyond a region of folding and in accordance with this invention;

FIG. 2 is a sectional view taken on the plane 2—2 of FIG. 1;

FIG. 3 is a diagrammatic sectional view showing the upper portion of the folding guide of FIG. 1 and showing other apparatus for applying welding heat when the apparatus is installed at the location A of FIG. 1;

FIG. 4 is a sectional view showing still other means for applying the welding heat when the heat is to be applied at the location B of FIG. 1;

FIG. 5 is a diagrammatic view showing application of welding heat by apparatus installed at the location C of FIG. 1;

FIG. 6 is a sectional view taken at the plane 6—6 of FIG. 1;

FIG. 7 is a greatly enlarged, fragmentary sectional view of a portion of the heating roll shown in FIG. 4; and FIG. 8 is a fragmentary, isometric view showing another modified form of the invention.

DESCRIPTION OF PREFERRED EMBODIMENT

FIG. 1 shows diagrammatically a web printing press designated by the reference character 10 having printing stations 12 and 14 for printing on paper webs 16 and 18, respectively. These webs 16 and 18 are representative of a plurality of webs that are printed at different printing stations and then brought together in superimposed relation at a folding station designated by the reference character 20. It will be understood that web printing presses are made with more than two printing stations and that the printing press of this invention can have any desired number of printing stations so that more paper webs will be superimposed and form in effect a series of connected booklets which sometimes have their leaves pasted in conventional presses but which have their leaves welded together in accordance with this invention.

At the folding station 20 there is a folding guide 22 with a sharply curved section 24 at which the webs 16 and 18 are first brought into contact with one another as they turn from their angularly related courses into a common downward course around the folding guide 22.

The web 16 is folded over the outside of the web 18 as the latter folds around the guide 22, and there are rolls 26 in contact with the outside surface of the outer web 16 to facilitate folding of the webs about the guide 22. In the construction shown there is a fin 28 of the folding guide 22 which extends through the space between the rollers 26 and downward to a termination just above a roller 30 about which the folded webs change their direction of travel as they advance toward a flying cut off or shear 32.

The flying shear 32 cuts the folded webs apart along lines which separate the groups of pages into separate booklets 34 which are carried away from the shear 32 by an endless belt conveyor 36. All of this construction may be conventional and the novelty of the present invention is the combining and correlating of the paper welding apparatus with the web printing press.

With the apparatus shown in FIG. 1 there are four locations at which heat can be applied to the paper to weld the superimposed sheets together at the desired locations. These locations are designated by the letters A, B, C and D. The apparatus shown in FIG. 1 has the heating means at the location D. Two wheels 42 and 44 with axles 46 and 48, respectively, contact with the folded web 16 which contains within it the folded web 18.

The wheels 42 and 44 bear against the paper on opposite sides thereof and along the fold and as close as practical to the actual fold itself. One or both of the wheels 42 and 44 is urged toward the other wheel by a force indicated by the arrow F and if force is not applied to both of the wheels, then the other wheel is rotated about a fixed axis of rotation and the force applied to the wheel which moves toward and from the fixed wheel causes a reaction force F in the fixed wheel. One, and preferably both of the wheels 42 and 44 are heated by internal heating means such as will be described in connection with FIG. 4 or by any other heating means which maintains the periphery of the wheel at a temperature high enough to heat the paper to a welding temperature throughout the full thickness of the superimposed webs and without raising the temperature of the outer paper which touches the wheels to a temperature at which the paper will char or be deteriorated by change of color or any other adverse change.

The pressures required for making the weld depends upon the grade of weldable paper and the considerations are similar to those described in connection with Pat. No. 3,560,290, previously referred to. The principal difference in welding with a web printing press as compared to the welding method disclosed in that patent are that the webs on the printing press are travelling at substantial speed. For this reason the wheels 42 and 44 are made of large diameter so that although their peripheral speed must be equal to the speed of the travelling web, the angular speed is less because of the large diameter. This means that each point on the periphery of the wheels 42 and 44 after leaving its contact with the paper does not come in contact with the paper again as soon as if the wheel were of small diameter. This extra time provides more time for putting back into the periphery of the wheel such heat as was taken out by its contact with the paper to make the weld.

FIG. 3 shows apparatus for applying heat to the superimposed webs at the location A of FIG. 1. This location is midway between the longitudinal edges of the webs and at the line where the webs are folded in the folding station. FIG. 3 shows the superimposed webs 16 and 18 passing over the curved section 24 of the folding guide 22. Because of the bending of the webs 16 and 18 around this curved section 24, the webs are in substantial contact with one another. A shoe 52 bears against the upper web 16 and this shoe has a crowned face in contact with the web so that the line of contact is very narrow.

The shoe 52 is connected to an insulation block 54 and supported from a fixed frame 56 attached to some part of the frame of the web printing press by brackets. The connection of the shoe 52 to the block 54 includes a leaf spring 58 which maintains a resilient pressure of the shoe 52 against web 16; and this pressure adds to that which holds the webs 16 and 18 in contact with one another as they pass around the curve section 24.

The shoe 52 is connected by a conductor 60 to a radio frequency generator; and the portion of the guide 22 immediately under the shoe 52 is the other electrode which connects with the high frequency generator.

The webs 16 and 18 can be welded together where they bend around the curved section 24 without having the heat generating means actually touch the webs. If the welding is to be done by radio frequency power, stray field electrodes can be used if provision is made for maintaining sufficient pressure between the webs 16 and 18 to avoid flashover. If a number of sheets is very few, as in FIG. 3, the welding heat can be applied where the webs 16 and 18 are firmly pressed together over the curved section 24 by virtue of their change in direction of pull, and without having the heating means touch the webs, by using a high density radiant heater with a slit to keep the line of heating narrow in a direction transverse of the direction of movement but the slit can be long in the direction of movement of the web. Such a construction is shown in FIG. 8.

A plate 62 is supported by a bracket 64 from a fixed part of the printing press frame. The plate 62 is spaced from the web 16 by a clearance in FIG. 8 by the reference character 68; and this clearance is sufficient so that the plate does not touch the web or cause any friction, but the slot 66 is close enough to the web 16 to prevent spreading of the heat rays which are projected through the slot 66 by infra red lamps 70 having lenses for concentrating the rays at the slot 66. In FIG. 8 the lamps 70 are displaced outward away from the plate 64 for clearer illustration, but it will be understood that they are located immediately adjacent to the plate 62 and supported from the plate in this embodiment of the invention.

FIG. 4 shows the heating means located at the location B of FIG. 1. The webs 16 and 18 are passing downwardly along a fin 72 at the lower end of the folding guide 22. Friction of the webs against the fin 72 is small because the folding guide is smooth and highly polished. A heating wheel 74 similar to the heating wheels 42 and 44 of FIG. 1 touches the outer web 16 and holds the webs against the rounded end of the fin 72 with sufficient pressure contact to make the weld when the wheel 74 heats the paper above the welding temperature of the paper.

The wheel 74 rotates on axle 76 which is supported in bearings 78 that are movable toward and from the fin 28 to control the pressure of the wheel 74 against the webs. The wheel 74 is heated internally in the same way as the wheels 42 and 44 of FIG. 1 and the internal construction will be described in connection with FIG. 7.

FIG. 5 shows the heating means applied at the location C of FIG. 1. A heating wheel 80 has an axle 82 supported by a yoke 84 at the upper end of a lever 86 which swings about pivot 88 attached to a fixed bracket 90 on a portion of the frame of the printing press.

The wheel 80, which is heated internally, as will be described in connection with FIG. 7, contacts with the outer web 16 at the location where the webs 16 and 18 pass around the roller 30. The wheel 80 is urged against the webs by resilient force supplied by a cylinder and piston motor 92 having its piston rod 94 pivotally connected to the arm 86 and having its cylinder connected with a pivot 96 extending from a fixed portion of the frame of the press. Compressed air is supplied to the cylinder and piston motor 92 through an air hose 98 and pressure may be increased or decreased as necessary to obtain the desired rolling pressure against the webs 16 and 18.

The wheel 74 in FIG. 4 and one or both of the wheels 42 and 44 in FIG. 1 can be supported by a lever and yoke similar to that shown in FIG. 5 with similar resilient means for urging the wheels toward the web with a controlled pressure.

FIG. 7 shows a sectional view through the wheel 74. In the construction shown the wheel has a peripheral face 102 which is shown crowned symmetrically about the center of the face but the crown of the face may have its maximum diameter nearer one side or can be made steeper when necessary to exert the pressure nearer to the edge of the superimposed webs. For installations such as FIG. 1 and FIG. 5, the heating wheel can be displaced axially so that a portion of the width of the peripheral face is beyond the edge of the paper and thus the crown of the heating wheel can be brought as near as necessary to the fold of the webs.

The circumferential portion of the wheel 74 with the peripheral face 102 is shown in FIG. 7 as the outer part of one side 103 of the wheel. On the other side of the wheel there is a cover plate 105 which constitutes a side of the wheel and this cover plate abuts against a shoulder 106 at the circumferential portion of the wheel and against a face 108 at the hub of the wheel. The cover plate 105 is secured to the rest of the wheel by screws 110 which secure the cover plate to bosses 112 which extend across the interior of the wheel from the wall 103.

A heating coil 116 extends around the entire circumferential portion of the wheel, near the face 102 so that the heat from the coil 116 has only a short path of travel to reach the face 102. The heating coil 116 is connected with slip rings 120 attached to the side 103 but insulated from the side wall of the wheel. Conductors 122 connect the heating coil 116 with the slip rings 120 and there are brushes 126 and 128 which bear against the different slip rings 120 to supply power to the heating coil 116.

In place of a single coil 116, many shorter coils connected in parallel can be used around the circumferential portion of the wheel 74 so as to supply power at lower voltage. One or more thermostats 132 are located in the wheel 74 sufficiently close to the heating coil 116 so as to make the temperature of the thermostats 132 proportional to that of the circumferential face 102 so as to control the temperature of the heating surface of the wheel 74.

For high speed printing presses, more than one of the heating means described for this invention can be used on the same press. For example, the heating means shown in FIG. 5 can be used, with wheel temperature less than that required for welding, as a pre-heater at the roller 30; and the wheels 42 and 44, located as close as possible to the roller 30, can be used to supply the final heat to weld the already preheated paper. Similarly preheating by means which does not touch the webs and thus cause some friction, as the radiant heaters of FIG. 8, can be used as preheaters ahead of any of the other welding means as an expedient for welding at full web printing press speed without requiring such rapid heat input into the generally circular rotating heating wheels that make the weld.

The preferred embodiments of the invention have been illustrated and described, but changes and modifications can be made, and some features can be used in different combinations without departing from the invention as defined in the claims.

What is claimed is:

1. A printing press having means by which legends are printed on a plurality of areas of paper travelling as a web with continuous motion through the press, one guide means that fold the web back on itself along a fold line to bring the printed areas into superimposed relation with one another as successive page of a publication and with corresponding edge portions of the pages in register with one another while the pages move with continuous motion, the printing press also including means for printing on a second web of paper, the printing means of the web press including printing stations each having a cylinder that rotates in contact with a web to print the legends on the travelling web, and other guide means for bringing the second web of paper into contact with the first web at a location to be inserted by said one guide means into nesting relation with the fold of the first web for providing additional pages of said publication in register with the edges of the pages formed by the folding of the first web, means located along the course of movement of the registering edge portions of the paper pages including a welding station at a location where the paper webs are in contact with one another along said fold line and with printed areas of the different webs superimposed, the welding station having a heater located adjacent to said fold line adapted to weld the nested pages together only along said fold line as said edge portions pass said welding station, said heater being in position for heating corresponding registering edge portions and having a heat transfer rate coordinated with the speed of travel of the paper and a severing station to transversely cut superimposed webs into separate reproductions of the printed matter.

2. The combination described in claim 1 chracterized by the heater contacting with one of the webs of paper at a location after the webs are brought together and being generally circular and having bearing means on which it rotates about an axis transverse of the direction of movement of the paper of the webs along said one guide means whereby the circumference of the heater travels with the contacting web paper to avoid friction with the web paper and possible gathering or wrinkling of the web paper, and means for supplying energy to the heater to heat the circumference of the heater to generate welding heat in the web paper as successive portions of the length of the fold come in contact with the successive regions of the circumference of the rotating heater.

3. The combination described in claim 2 characterized by the heater being a wheel with a crowned circumference that presses the travelling paper webs against an underlying surface of said one guide means, electric heating means within the wheel and close to the circumference thereof, and means for supplying electric current to the electric heating means within the wheel including slip rings secured to the side of the wheel and insulated from one another, each of the slip rings being connected to a different side of the circuit of the electric heating means, and a different brush outside of the wheel at a fixed location over the different rings and each bearing against a different ring.

4. The combination described in claim 1 characterized by the welding station being located beyond the means for folding the webs in the direction in which the paper travels with continuous motion.

5. The combination described in claim 1 characterized by the paper used in the press being a paper of similar composition throughout its area and having a resin therein that softens to a welding condition at a temperature less than the temperature at which the paper becomes discolored by heat, and the means for heating comprising elements that transmit energy to the travelling paper webs along the fold line at a rate to soften the resin system and bond the webs together along said line when they are travelling through the welding station.

6. The combination described in claim 1 characterized by the means for heating the webs including radio frequency heating means the generate heat within the paper of the travelling webs whereby heat flow by conduction through the paper which has poor heat conductivity is unnecessary to reach the paper of the second web that is nested in the fold of the first web.

7. The combination described in claim 1 characterized by means for clamping the travelling webs in contact with one another during the welding of the webs to one another, the clamping means on at least one side of the webs being a rotary element that turns with a peripheral surface that touches one of the paper webs travelling at substantially the same linear speed as the paper.

8. The combination described in claim 7 characterized by the clamping means on each side of the webs being a rotary element that turns with a peripheral surface that touches the paper and at the same speed as the paper.

9. The apparatus described in claim 1 characterized by means of the welding station in position to supply preliminary heat of a degree less than required for welding and immediately ahead of the welding station so that the paper is raised to welding heat at the welding station more quickly as the web passes the welding station at its speed of travel through the web press.

References Cited
UNITED STATES PATENTS

| | | | |
|---|---|---|---|
| 3,697,061 | 3/1971 | Levine et al. | 270—5 |
| 2,579,488 | 12/1951 | Freeman | 281—21 R |
| 2,463,769 | 3/1949 | Higgins | 281—21 R |
| 2,971,874 | 2/1961 | Canno | 156—202 |
| 2,579,488 | 12/1951 | Freeman | 156—477 B |
| 3,386,874 | 6/1968 | Gros | 156—273 X |
| 3,162,561 | 12/1964 | Farkas | 156—277 X |
| 3,560,290 | 2/1971 | Sendor et al. | 156—227 |
| 2,946,281 | 7/1960 | Sohn | 156—277 |
| 3,532,581 | 10/1970 | Blair | 156—461 |
| 3,355,337 | 11/1967 | Zelnick | 156—499 X |

CHARLES E. VAN HORN, Primary Examiner

B. J. LEWRIS, Assistant Examiner

U.S. Cl. X.R.

156—277, 385, 461, 499, 510, 555, 583; 270—5